Figure 1:
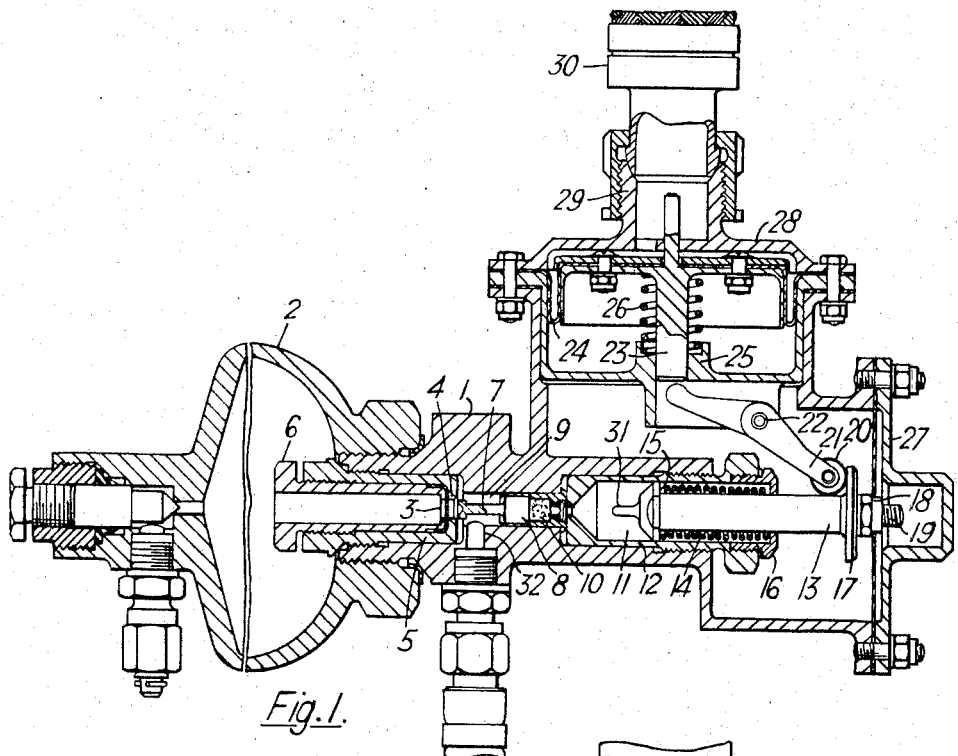

Oct. 31, 1967     J. MARTIN     3,349,786
PRESSURE-SENSITIVE MECHANISM
Filed Feb. 15, 1963

Inventor
JAMES MARTIN
By Kurt Kelman
Agent

United States Patent Office 3,349,786
Patented Oct. 31, 1967

3,349,786
PRESSURE-SENSITIVE MECHANISM
James Martin, Southlands Manor, Southlands Road, Denham, near Uxbridge, Middlesex, England
Filed Feb. 15, 1963, Ser. No. 258,833
Claims priority, application Great Britain, Feb. 16, 1962, 5,992/62
2 Claims. (Cl. 137—68)

This invention concerns pressure-sensitive mechanisms adapted to be actuated by variations in ambient pressure. More particularly the invention is concerned with pressure-sensitive mechanisms adapted to respond to increases in hydrostatic pressure, an object of the invention being to provide a hydrostatic pressure-sensitive mechanism particularly suitable for initiating the operation of a vehicle ejection seat upon immersion of the vehicle in water.

With the advance that has taken place in the development of aircraft ejection seats and associated escape systems, the likelihood of an airman having to enter the water while in his aircraft, for example in the event of an emergency whilst flying over the sea, has been reduced to almost negligible proportions. However, in the case of aircraft operating from naval aircraft carriers, there is an ever present danger of an airman and his aircraft entering the water as a result of the aircraft failing to be arrested by the arrestor devices on the carrier and falling over the side of the carrier or as a result of engine failure or like mishap during take-off.

It is with this hazard in mind that the mechanism of the present invention has been devised.

Thus, according to one aspect of this invention there is provided a pressure-sensitive valve mechanism comprising a tubular body a portion of which is sealed by a frangible valve member. A cylinder aligned with that body portion encloses a piston which is movable toward and away from the valve member. A pin on the piston ruptures the valve member during movement of the piston toward the same. An explosive charge is offset in the cylinder in a direction away from the valve member, and may be fired by an arrangement which includes a firing pin and yieldably resilient means which bias the firing pin toward a position of engagement with the charge. A diaphragm is moved in a predetermined direction in response to an increase in the pressure to which the apparatus is sensitive and to which the diaphragm is exposed. Motion is transmitted between the diaphragm and the firing pin in such a manner that the firing pin is normally held remote from the afore-mentioned position of engagement against the bias of the resilient means, is moved from the last-mentioned remote position in a direction away from the explosive charge when the diaphragm moves a certain distance in said predetermined direction, and is released for movement by the resilient means when the diaphragm moves beyond the certain distance in the same direction.

More specifically, a dished abutment is mounted on the firing pin in such a manner that its concave face is directed toward the explosive charge. A dent member mounted on the tubular body moves transversely of the direction of movement of the firing pin from its remote position toward the explosive charge while abuttingly engaging the concave face, and is connected to the diaphragm for joint movement.

Thus in preferred embodiments of the invention, the pressure-sensitive mechanism comprises a diaphragm adapted to be displaced by the pressure to which the mechanism is to respond, a spring-biased plunger having a collar thereon, and a lever co-operating with said diaphragm and said collar normally to restrain said plunger in an inoperative position, said lever being adapted to be moved clear of said collar to release the plunger for movement by its spring-biasing to an operative position in response to movement of the diaphragm under pressure in excess of a predetermined value.

Said lever may conveniently be pivoted between its ends, one end of the lever being positioned for engaging said collar on the plunger and the other end of the lever being engaged by a spindle arranged perpendicularly of the plunger and connected to the diaphragm to be moved endwise upon deflection of the diaphragm under pressure changes.

The movement of the actuating member or plunger to its said operative position may be effective to perform or initiate performance of any desired controlling function. For instance, such movement may be effective to operate electrical switch means in chosen control circuits or it may be effective to fire an explosive cartridge to generate gas under pressure for utilization by suitable actuators to effect desired control functions.

Thus in a preferred embodiment of the invention, movement of the actuating member to its operative position is effective to fire an explosive cartridge to generate gas pressure for opening valve means controlling a supply of pressure fluid, for instance compressed air, which is utilized, directly or indirectly, to achieve operation of an ejection seat.

The pressure fluid supply controlled by said valve means may, in application of the mechanism to an aircraft ejection seat, be utilized directly to effect seat ejection by causing extension of the ejection gun of the seat and conveniently the mechanism of the invention is adapted to be used in conjunction with an ejection gun as disclosed in copending application Ser. No. 258,830, now U.S. Patent No. 3,180,593, of even date, the mechanism being adapted to control the supply of compressed air from a storage botle to such ejection gun so as to cause the feeding of the stored compressed air to the gun upon exposure of the diaphragm of the mechanism to a pressure corresponding to the hydrostatic pressure applied to an aircraft upon immersion of the aircraft in water.

Figure 2:
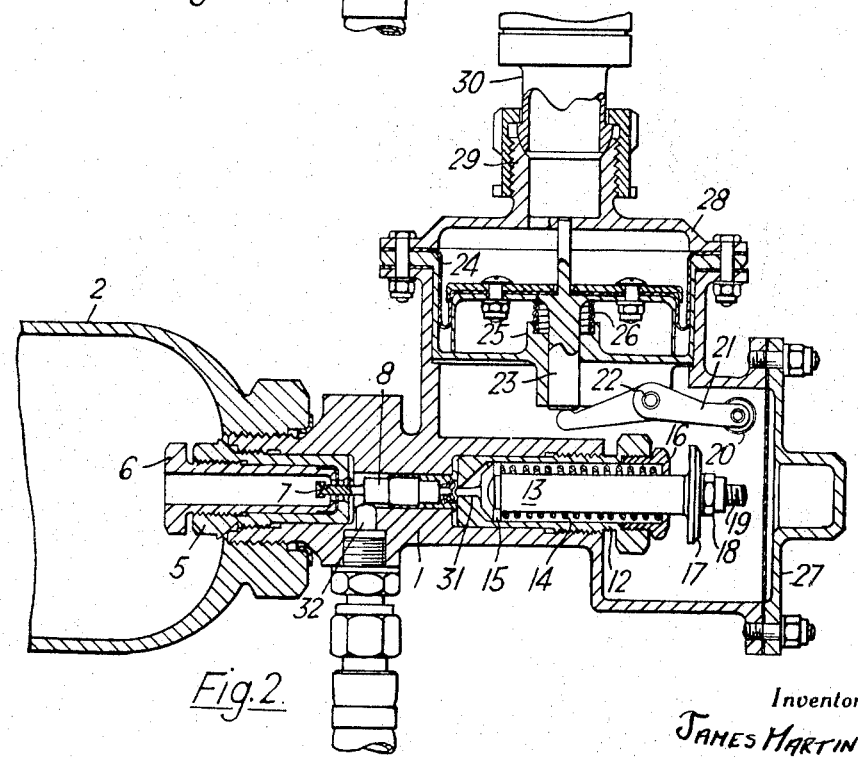

A typical embodiment of the invention, intended to control the operation of an aircraft ejection seat having an ejection gun, such as disclosed in said copending application, which may be extended, for underwater seat ejection, by compressed air, is illustrated in the accompanying drawings, in which:

FIGURE 1 is a plan section of a pressure-sensitive mechanism in accordance with the invention, showing such mechanism in its normal (unoperated) condition; and FIGURE 2 is a view corresponding with FIGURE 1 but showing the mechanism in the operated condition thereof.

The pressure-sensitive mechanism illustrated in the drawings comprises a substantially tubular body 1 one end of which is adapted to be threadedly and sealingly secured to the head of a storage bottle 2 for compressed air. In the normal condition of the mechanism, as shown in FIGURE 1, such end of the body 1 is closed by a frangible disc 3 trapped against an annular seat 4 in a tubular plug 5 by means of a retaining tubular stud 6, the plug 5 being threadedly secured in said end of the body 1.

The frangible disc 3 is adapted to be punctured by a pin 7 on the adjacent end of a piston 8 reciprocable within a cylinder 9 constituted by a reduced diameter part of the bore of the body 1. An explosive cartridge 10 is located in cylinder 9 on the side of the piston remote from the disc 3, the cartridge having a case that seals the corresponding end of such cylinder and releasably holds piston 8 to retain pin 7 clear of disc 3 until the cartridge is fired.

The bore part 11 of body 1 is fitted with a sleeve 12 in which a plunger 13 carrying a firing pin 31 is reciprocable, the pin being urged towards the cartridge 10 by a compression spring 14 acting between a shoulder 15 on the plunger and a plug 16 at the end of sleeve 12.

The end of the plunger 13 remote from the cartridge 10 has a slightly dished or saucer-like collar 17 retained on the end of the plunger 13 by a lock nut 18 on a threaded extension 19 of the plunger, this slightly dished collar 17 being engaged by a roller 20 on one end of a rocking lever 21 pivoted between its ends on a transverse pin 22 and lying in an enlargement of the body 1 so as to extend alongside the plunger 13. When the roller 20 of the lever 21 engages the dished collar 17, the plunger 13 is in an inoperative, retracted, position and the compression spring 14 is stressed.

The other end of the rocking lever 21 is engaged by a spindle 23 projecting from the centre of a flexible diaphragm 24 that covers an opening in the side wall of the body 1, spindle 23 being perpendicular to the axis of the body bore and to the general plane of the diaphragm 24. The spindle 23 is guided for longitudinal movement by a guide boss 25 in a spider arranged in said enlargement of the body 1 and urged away from boss 25 by a spring 26. A removable sealing cap 27 closes the end of the body remote from the frangible disc 3.

The opening covered by the diaphragm 24 is formed in a detachable cap 28 forming part of the body wall and is surrounded by a boss 29 adapted for connection to a pipe or duct 30 in communication with the outside of an ejection seat-equipped aircraft so that hydrostatic pressure applied to the aircraft upon immersion of the aircraft will be transmitted to the diaphragm 24 to tend to cause movement of this and spindle 23 to rock the rocking lever 21 to release the collar 17 on the plunger 13 from engagement with the roller on the lever. The dished shape of collar 17 causes outward movement of the plunger, against the effort of spring 14, to occur prior to release of the collar on rocking of lever 21, whereby inadvertent release of the collar is precluded. The lever 21 is balanced about its pivot pin 22 so that acceleration loads will not cause rocking of the lever.

Disengagement of the roller 20 on the rocking lever 21 from the dished collar 17 permits the plunger 13 to move under the influence of the compression spring 14 so that the pin 31 at the end of the plunger is driven into the percussion cap of cartridge 10 to fire the latter; firing of the cartridge generates gas pressure which propels piston 8 and pin 7 towards the disc 3 so that the latter is pierced and compressed air within the storage bottle 2 released to flow through the body bore around the pin 7 to escape through a side exit 32 in the body 1 and thence through a non-return valve (not shown) into the ejection gun of the ejection seat (not shown). The condition of the mechanism following rocking of lever 21 to release collar 17 is shown in FIGURE 2.

I claim:
1. A pressure-sensitive valve mechanism comprising, in combination:
(a) a tubular body;
(b) a frangible valve member in a portion of said tubular body and sealing the same;
(c) a cylinder aligned with said portion of said tubular body;
(d) a piston member movable in said cylinder toward and away from said valve member;
(e) pin means on said piston member for rupturing said valve member when said piston member moves toward the same;
(f) an explosive charge in said cylinder and offset from said piston member in a direction away from said valve member;
(g) firing means for firing said explosive charge which includes
 (1) a firing pin movable toward and away from a position of engagement with said charge, and
 (2) yieldably resilient means biasing said firing pin toward said position of engagement;
(h) diaphragm means exposed to the pressure to which the mechanism is sensitive, and arranged to move in a predetermined direction in response to an increase in said pressure; and
(i) motion transmitting means interposed between said diaphragm means and said firing pin for normally holding the same in a position remote from said position of engagement against the bias of said resilient means, for moving said firing pin from said remote position in a direction away from said charge when said diaphragm means moves a predetermined distance in said predetermined direction, and for releasing said firing pin for movement thereof by said resilient means when said diaphragm moves beyond said distance in said predetermined direction.

2. A mechanism as set forth in claim 1, wherein said motion transmitting means include a dished abutment on said firing pin having a concave face directed toward said charge, a detent member mounted on said body for movement transversely of the direction of movement of said firing pin from said remote position toward said charge while said detent member abuttingly engages said face, and means connecting said detent member to said diaphragm means for joint movement.

References Cited

UNITED STATES PATENTS

| 1,518,595 | 12/1924 | Mauran | 137—68 X |
| 1,704,944 | 3/1929 | Johann | 137—68 X |
| 2,515,068 | 7/1950 | Young | 137—68 X |
| 2,697,538 | 12/1954 | Seeler | 137—68 X |
| 2,946,484 | 7/1960 | Stoner | 222—5 |

WILLIAM F. O'DEA, *Primary Examiner.*

ISADOR WEIL, *Examiner.*

R. GERARD, *Assistant Examiner.*